L. GOODWIN.
GRAVE LINING DEVICE.
APPLICATION FILED MAR. 31, 1919.
1,348,405. Patented Aug. 3, 1920.
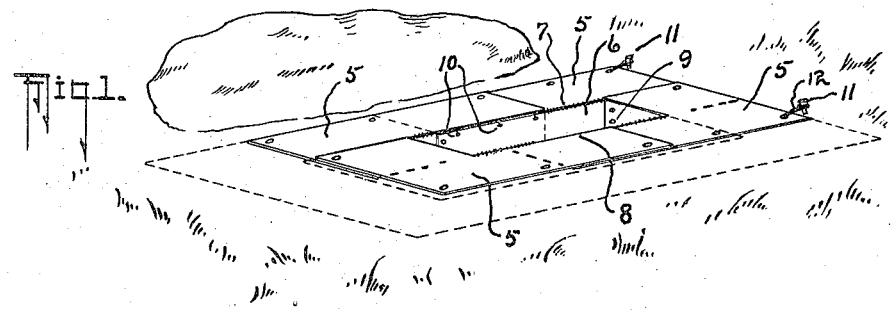
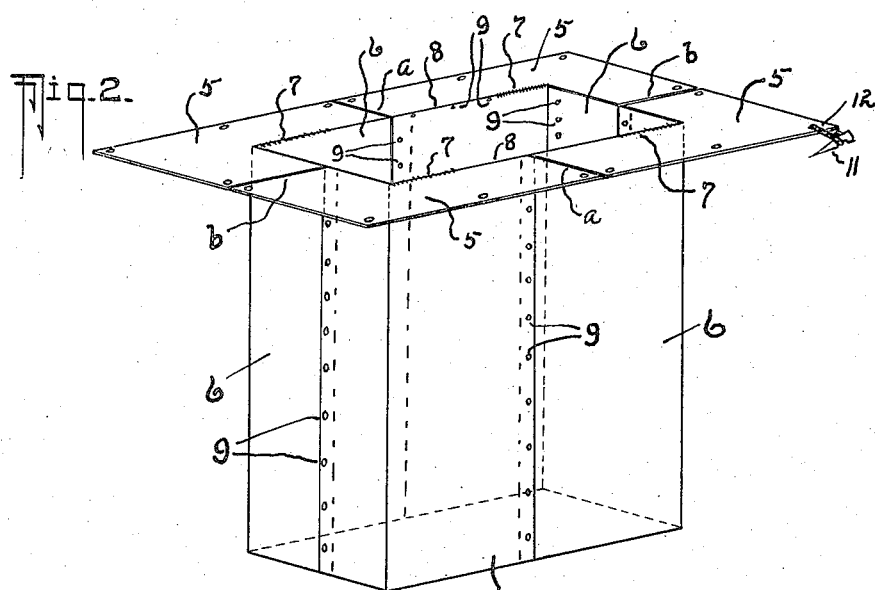
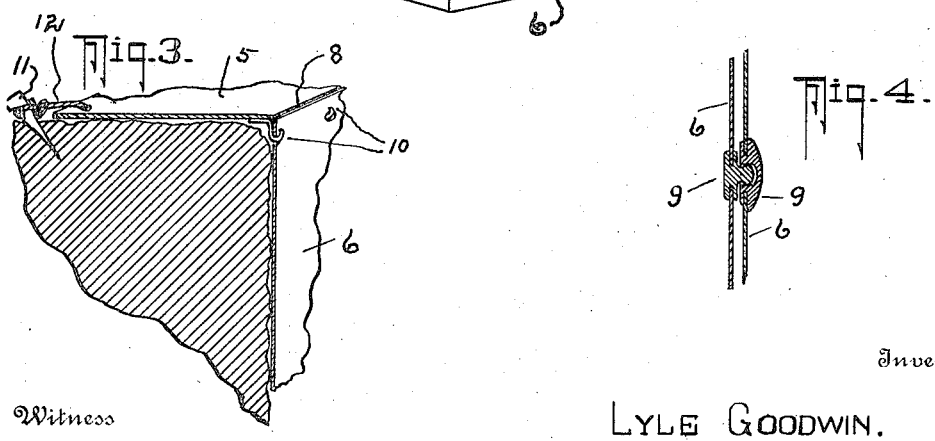
Witness
Arthur R. Mitchell
Inventor
LYLE GOODWIN.
By Arthur H. Sturges.
Attorney

UNITED STATES PATENT OFFICE.

LYLE GOODWIN, OF OMAHA, NEBRASKA.

GRAVE-LINING DEVICE.

1,348,405.  Specification of Letters Patent.  Patented Aug. 3, 1920.

Application filed March 31, 1919. Serial No. 286,339.

*To all whom it may concern:*

Be it known that I, LYLE GOODWIN, citizen of the United States, residing at Omaha, in the county of Douglas and State of Nebraska, have invented certain new and useful Improvements in Grave-Lining Devices, of which the following is a specification.

This invention relates to a grave lining device, and has for its object to provide horizontal sections substantially of L-shape in plan, for covering a part of the surface of the ground adjacent to a grave opening and provided at their inner edges with dropsheets or wings to entirely cover the vertical side and end walls of the opening, the sections being adjustable longitudinally and transversely of the grave opening so that they may be used upon openings of different lengths and widths, means also being provided for connecting the horizontal sections and the vertical wings, and means also being provided for temporarily securing the horizontal sections to the ground.

The novel features of the invention are fully described herein and in the appended claim, and are illustrated in the accompanying drawing, wherein,—

Figure 1 is a perspective view showing the device applied to a grave opening, the sections and wings being overlapped and connected. Fig. 2 is a perspective view of the device applied to a grave opening of larger size, the sections not being overlapped, and the vertical wings being connected. Fig. 3 is a perspective view, parts being in section to show a connecting means for a horizontal section and a vertical wing. Fig. 4 is a sectional detail showing the vertical wings of two sections in connected relation.

Referring now to the drawing, the device includes four L-shaped strips or sections 5 of any desired material, these being approximately of uniform shape and proportion, adapted to cover the surface of the ground adjacent to a grave opening, each L-shaped section 5 being provided at its inner edges with a rectangular wing or sheet 6 of suitable material having a length slightly greater than the length of the inner edges of a section and having a width substantially equal to the depth of the grave opening, the connection of each L-shaped section with its vertical sheet being by stitching as indicated at 7, and each vertical sheet having a part of its upper edge disconnected from an L-shaped section as indicated at 8.

For use on large grave-openings the parts are disposed as shown in Fig. 2, the edges $a$ at one of the ends of the respective L-shaped sections being disposed parallel and closely adjacent to each other at the sides of the grave opening, and the edges $b$ at the reverse ends of the sections being disposed at the ends of the opening, said edges being closely adjacent to each other, and thereby the surface of the ground adjacent to a grave opening will be covered, the vertical walls of said opening being covered by the rectangular wings or sheets 6, the vertical edges of said sheets overlapping and being connected by any suitable coöperating devices or clasps 9, and the disconnected parts 8 being removably connected, at the top of the wall of the grave opening, by suitable hooks 10, provided for the sections 5, and which engage in the vertical sheets, near their upper edges. To prevent creasing of the L-shaped sections and to maintain them in a taut, horizontal position, the material used generally being cretonne, velvet carpet or other fabrics, I have used small pins or stakes 11 adapted to be driven in the ground, strands 12 being employed for connecting the sections therewith.

By use of the device it will be appreciated that the usual shock attending burials will be lessened when the casket is lowered within a grave opening, the bare walls of earth not being visible. After those who were in attendance at a burial have departed, and before the grave opening has been filled with earth, the device is removed.

It will be understood that the device, when used for smaller grave openings, may be disposed in overlapped relation, the body portions of two L-shaped sections at opposite sides of the grave being disposed to overlap the body-portions of the remaining two L-shaped sections at said opposed sides, the transversely disposed parts of said L-shaped sections at the ends of the grave opening being covered or overlapped by the transverse part of another L-shaped section, and on account of this feature the device may be adjusted for use on grave openings differing in area.

Also by referring to Fig. 1 it will be seen that the detached parts 8 of the vertical sheets at the sides of a grave opening may be disposed below the detached parts 8 of the adjacent horizontal sections, which is a desired feature since a more harmonious appearance is presented and on this account the L-shaped sections may be held in a horizontal position to better advantage.

I claim,—

A device of the character described including four L-shaped sections, being counterparts of each other and placed with adjacent edges in overlapping and slidable relation, whereby to form an adjustable rectangle adapted to be placed horizontally on the upper face of the earth about a grave opening, sheets depending from the inner edges of said L-shaped members and passing under, and in close proximity to the vertical walls of the grave, the adjacent edges of said sheets being arranged in overlapping and sliding relation to permit increases and decreases in the size of the box-like formation made by the combined sheets, means for securing the sheets together in spaced relation along the overlapping edges, portions of the upper edges of the sheets being secured to the inner edges of the L-shaped members and portions thereof being left free, hooks on the L-shaped members, whereby the free edges may be supported, the outer edges of the L-shaped members being perforated, strands adapted to pass through said perforations, and stakes adapted to be driven into the ground and engaging with said strands for holding the L-shaped members in place.

In testimony whereof I have affixed my signature in presence of two witnesses.

LYLE GOODWIN.

Witnesses:
HIRAM A. STURGES,
ARTHUR H. STURGES.